US012748236B2

(12) United States Patent
Cartwright et al.

(10) Patent No.: US 12,748,236 B2
(45) Date of Patent: Sep. 29, 2026

(54) APPARATUS AND METHOD FOR DETECTING A DISPENSING EVENT IN A BULK PRODUCT DISPENSING SYSTEM

(71) Applicant: ILLINOIS TOOL WORKS INC., Glenview, IL (US)

(72) Inventors: Kevin Cartwright, Halesowen (GB); Ian Taylor, Kenilworth (GB); Timothy Robert Lowe, Ratcliffe Culey (GB); Hugh Connell, Alcester (GB)

(73) Assignee: ILLINOIS TOOL WORKS INC., Glenview, IL (US)

(*) Notice: Subject to any disclaimer, the term of this patent is extended or adjusted under 35 U.S.C. 154(b) by 38 days.

(21) Appl. No.: 18/807,362

(22) Filed: Aug. 16, 2024

(65) Prior Publication Data

US 2025/0060509 A1 Feb. 20, 2025

(30) Foreign Application Priority Data

Aug. 17, 2023 (GB) ..................................... 2312570
Aug. 15, 2024 (GB) ..................................... 2412062

(51) Int. Cl.
*G01V 8/20* (2006.01)
*B65D 83/00* (2006.01)

(52) U.S. Cl.
CPC ............... *G01V 8/20* (2013.01); *B65D 83/00* (2013.01)

(58) Field of Classification Search
CPC .................................. G01V 8/20; B65D 83/00
See application file for complete search history.

(56) References Cited

U.S. PATENT DOCUMENTS 5,246,118 A * 9/1993 Mosher ................ G01G 13/026 177/52
5,768,327 A * 6/1998 Pinto ....................... G06M 1/00 377/7
12,185,847 B2 * 1/2025 Pavlich ................... A47F 1/035
2009/0159153 A1 * 6/2009 Luechinger ........... G01F 13/001 141/331
2010/0116974 A1 * 5/2010 Liu .......................... G01V 8/20 250/222.2
2011/0303137 A1 * 12/2011 Tevs ....................... A01C 7/105 356/432
2012/0199606 A1 * 8/2012 Gunstad .................. A47F 1/035 426/115

(Continued)

FOREIGN PATENT DOCUMENTS

EP 0207567 A1 1/1987
EP 3922139 A1 12/2021

(Continued)

*Primary Examiner* — Michael A Riegelman
(74) *Attorney, Agent, or Firm* — THOMPSON HINE LLP

(57) ABSTRACT

An apparatus for detecting a dispensing event in a bulk product dispensing system includes: a sensor arrangement for detecting flow of product through a detection zone, the sensor arrangement comprising a transmitter module a receiver module, wherein, in use, the flow of product through the detection zone causes a transmission beam between the transmitter module and receiver module to be altered; and at least one retainer for retaining the sensor arrangement about the detection zone. A bulk product dispensing system and method are also provided.

18 Claims, 5 Drawing Sheets

(56) References Cited

U.S. PATENT DOCUMENTS

| | | | | |
|---|---|---|---|---|
| 2014/0091898 | A1* | 4/2014 | Burger | G01V 8/20 340/3.1 |
| 2014/0192886 | A1* | 7/2014 | Fran Ois | H04N 19/33 375/240.16 |
| 2015/0115181 | A1* | 4/2015 | Eble | G01J 1/44 250/578.1 |
| 2017/0049977 | A1* | 2/2017 | Eicher | A61M 15/0081 |
| 2019/0311568 | A1* | 10/2019 | Allegra | G07F 11/50 |
| 2020/0096458 | A1* | 3/2020 | Kucharczyk | G01V 8/20 |
| 2021/0131941 | A1* | 5/2021 | Zhang | G01V 8/20 |
| 2022/0296009 | A1* | 9/2022 | Pavlich | A47F 1/035 |
| 2025/0060239 | A1* | 2/2025 | Cartwright | G01G 23/18 |
| 2025/0060509 | A1* | 2/2025 | Cartwright | B65D 83/00 |
| 2025/0169622 | A1* | 5/2025 | Conway | G07F 11/16 |

FOREIGN PATENT DOCUMENTS

| | | | | | |
|---|---|---|---|---|---|
| GB | 2102118 | A | * | 1/1983 | B67D 3/02 |
| GB | 2632686 | A | * | 2/2025 | G01P 13/0086 |
| WO | WO 2022/251604 | A1 | | 12/2022 | |

* cited by examiner

APPARATUS AND METHOD FOR DETECTING A DISPENSING EVENT IN A BULK PRODUCT DISPENSING SYSTEM

TECHNICAL FIELD

This invention relates to an apparatus, to a bulk product dispensing system, and to a method.

BACKGROUND

In order to reduce packaging waste, retailers are increasingly providing products using bulk product dispensing systems. Bulk product dispensing systems include a dispenser comprising a hopper or other container for storing a loose product in bulk quantity. A customer operates the dispenser to dispense a desired quantity of product into a container, and weighs the dispensed product at a scale to produce a label for scanning at a point of sale. In this way the customer can re-use containers to reduce packaging waste, and can select a bespoke quantity of product for purchase.

It may be desired to detect dispensing events, i.e., detect each time a dispenser is operated to monitor the number of expected transactions for the product. This has been achieved by providing an accelerometer sensor on a dispenser handle to detect actuation.

Such detection is associated with a number of issues, including limited battery life of sensors, difficulty in replacing a hopper for cleaning due to the integrated electronic components, and low accuracy of detection due to false readings from the stuttering motion of dispenser handles.

Examples disclosed herein may address one or more of the above problems.

SUMMARY

In accordance with the present inventions there is provided an apparatus, a bulk product dispensing system and a method as claimed in the appended claims.

According to a first aspect, there is provided an apparatus for detecting a dispensing event in a bulk product dispensing system, the apparatus comprising: a sensor arrangement for detecting flow of product through a detection zone, the sensor arrangement comprising a transmitter module and a receiver module, wherein, in use, the flow of product through the detection zone causes a transmission beam between the transmitter module and receiver module to be altered; at least one retainer for retaining the sensor arrangement about the detection zone. For example, the flow of product may cause the transmission beam to be broken. Alternatively or additionally, the flow of product may cause the transmission beam to be altered be altered beyond a predefined threshold, such as an intensity threshold, a frequency threshold, or an amplitude threshold. The at least one retainer may be a detector frame.

Advantageously, the apparatus is arranged to detect flow of the product itself, and thus can accurately detect successful dispensing events without being triggered for example by a handle actuation if the dispenser is empty, or erroneously triggered multiple times by a jittery actuation of the handle.

In some embodiments, the apparatus comprises a fixture extending from the at least one retainer, the fixture being configured to mount the apparatus to a surface. Advantageously, via the fixture, the apparatus can be mounted in isolation from the dispenser below a spout of the dispenser. This enables the apparatus to be utilized with a range of dispenser types, for the dispenser to be easily replaced for cleaning, and for the sensor arrangement to be provided with wired power and data links via the fixture, avoiding the necessity for battery replacement. In some embodiments, the fixture may be connectable to a directing apparatus located adjance, i.e. below, the sensor arrangement of the apparatus. This enables for the product to flow more accurately into a receptacle.

The apparatus may comprise an attachment mechanism for releasably attaching a bulk product hopper to the apparatus, such that when the bulk product hopper is attached to the apparatus, a dispensing path from a spout of the bulk product hopper intersects the detection zone of the sensor arrangement. Thus, the hopper can be easily aligned with the detection zone whilst being easily attached and detached from the apparatus.

Optionally, the transmitter module is disposed on a first side of the detection zone and the receiver module is disposed on a second side of the detection zone opposing the transmitter module. Optionally, the at least one retainer comprises a detector frame surrounding the detection zone, the transmitter module is disposed on a first inner surface of the detector frame facing the detection zone, and the receiver module is disposed on a second inner surface of the detector frame opposing the first inner surface and facing the detection zone. Thus, the detector frame may define a boundary of the detection zone. Advantageously, surrounding the detection zone with the frame provides structural rigidity to the frame to prevent tampering.

The detector frame may be a polygonal frame, wherein the transmitter module is retained on a first side of the polygonal frame and the receiver module is retained on a second opposing side of the polygonal frame. For example, the polygonal frame may be square or rectangular. The detector frame may be formed from a rigid material.

Optionally, the apparatus comprises an electronic shelf label, ESL, mounted on an outer surface of the at least one retainer. Advantageously, the apparatus provides a location for mounting an ESL separately from the hopper.

The fixture may comprise a mounting mechanism for mounting the apparatus to a surface, a first flexible arm portion attached to the detector frame and a second rigid arm portion connecting the first flexible arm portion to the mounting mechanism. Advantageously, the rigid arm portion provides structural support for securing the apparatus whilst the flexible portion allows the sensor arrangement some movement when attaching or detaching the bulk product hopper, to avoid damage to the apparatus. The first flexible arm portion may be formed from plastic moulding and the second rigid arm portion may be metallic. Optionally, the first flexible arm portion comprises an concertinaed surface. Optionally, the mounting mechanism is configured to mount the apparatus to a moveable mechanism, such as a cantilever, that is mounted to the surface. Advantageously, the moveable mechanism enables the dispenser to be moved relative to the surface, about a pivot point, such that a dispenser's location is extended forward from surface, and from any other dispensers mounted to the surface. Additionally, the moveable mechanism enables the dispenser to be lowered from it's original location. Thereby, the moveable mechanism allows for the dispenser to be easily accessed for cleaning and for refilling.

The sensor arrangement may comprise a plurality of transmitter modules and a plurality of corresponding receiver modules. Optionally, the sensor arrangement comprises: a plurality of alternately spaced transmitter and receiver modules along a first side of the detection zone; and a corresponding plurality of alternately spaced transmitter and receiver modules along a second side of the detection zone, such that each transmitter module opposes a receiver module and vice versa; wherein, in use, the flow of product through the detection zone causes a transmission beam between at least one of the transmitter modules and its opposing receiver module to be altered. The plurality of alternately spaced transmitter and receiver modules may be spaced at intervals of between 5 mm and 15 mm, for example 10 mm or 12 mm. Advantageously, the alternate spacing enables the transmission beams of each module to tessellate fully without gaps in the detection zone, enabling product to be detected at any location within the detection zone.

Optionally, the or each transmitter module comprises an infra-red, IR, transmitter module configured to generate an IR pulse and the or each receiver module comprises an infra-red, IR, receiver module configured to detect the IR pulse generated by the corresponding IR transmitter module. The IR transmitter module may comprise an LED, and the IR receiver module may comprise a photodiode. Alternatively, the or each transmitter module may be configured to transmit another type of electromagnetic, EM, wave such as visible light, or another wave type such as an ultrasonic beam. Each receiver module may be configured to detect the wave transmitted by the transmitter module. Optionally, each transmitter module is arranged to generate a transmission beam of IR pulses at 300-400 Hz, such as 333 Hz.

The apparatus may further comprise at least one power line mounted to the fixture for supplying electrical power to the sensor arrangement from an external power supply. The apparatus may further comprise at least one wired data connection mounted to the fixture for supplying sensor data from the sensor arrangement to an external controller.

According to a further aspect there is provided bulk product dispensing system comprising: an apparatus as disclosed herein, and a bulk product hopper releasably attached to the apparatus, such that a dispensing path from a spout of the bulk product hopper intersects the detection zone of the sensor arrangement.

The bulk product dispensing system may further comprise a control module communicatively coupled to the sensor arrangement, wherein the control module is arranged to: receive a detection signal from the sensor arrangement indicative that the transmission beam between the transmitter module and the receiver module has been altered; and determine that a dispensing event has occurred for the bulk product hopper in dependence on receiving the detection signal.

Optionally, the bulk product dispensing system further comprises a weighing apparatus, wherein the control module is configured to transmit a control signal to a weighing apparatus in dependence on the determination that a dispensing event has occurred for the bulk product hopper, and wherein the weighing apparatus is configured to display an indication of the dispensing event for the bulk product hopper on a display device of the weighing apparatus.

Optionally, the bulk product dispensing system comprises a further apparatus as disclosed herein, and a further bulk product hopper releasably attached to the further apparatus, wherein the control module is communicatively coupled to the sensor arrangement of each of the apparatus and the further apparatus.

According to another aspect there is provided a method for detecting a dispense event using the bulk product dispensing system as disclosed herein, comprising: generating, at the transmitter module, the transmission beam; detecting, at the receiver module, an alteration in the transmission beam; in dependence on the detection of the alteration in the transmission beam, transmitting a detection signal to the control module; and determining that a dispensing event has occurred for the bulk product hopper in dependence on receiving the detection signal.

BRIEF DESCRIPTION OF THE DRAWINGS

Embodiments of the invention are further described hereinafter with reference to the accompanying drawings, in which.

DETAILED DESCRIPTION

Figure 1:
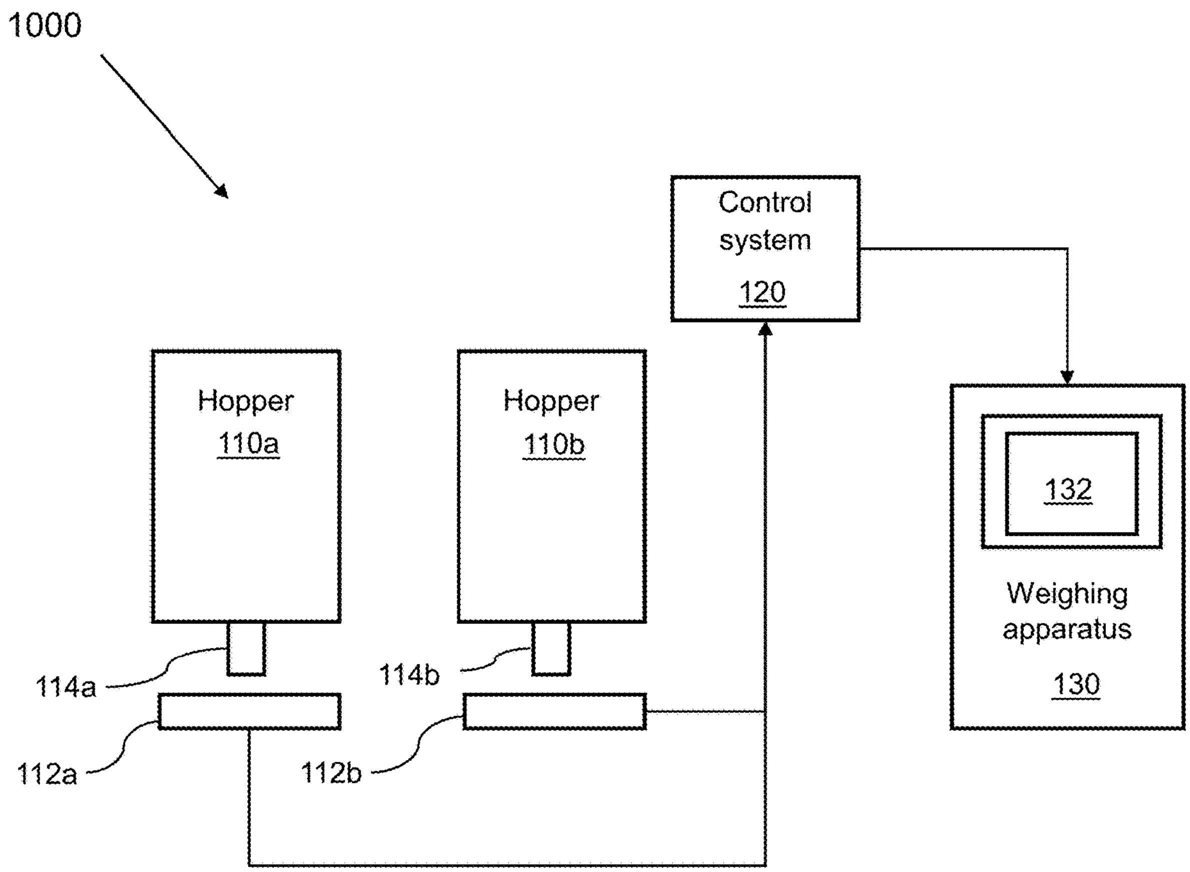
FIG. 1 is a schematic illustration of a bulk product dispensing system according to an embodiment.

Examples disclosed herein relate to a bulk product dispensing system. With reference to FIG. 1, there is shown a schematic illustration of a bulk product dispensing system 1000 according to an embodiment of the invention. The bulk product dispensing system 1000 is typically disposed in a retail environment, such as a supermarket or the like, where a retailer may facilitate bulk or loose purchase of goods.

The bulk product dispensing system 1000 comprises one or more bulk product hoppers 110_a_, 110_b_. The illustrated system 1000 comprises two hoppers 110_a_, 110_b_, however in other embodiments the system 1000 may only comprise one hopper 110_a_, or may comprise additional hoppers.

Each bulk product hopper 110_a_, 110_b_ is arranged to store a bulk product and dispense the bulk product to customers. For example, the bulk product hopper 110_a_, 110_b_ may be arranged to store a bulk food product such as grain, pasta, coffee or the like. The bulk product hopper 110_a_, 110_b_ may be used to store any product which can be dispensed and sold per unit weight in the retail environment. Typically, a respective hopper 110_a_, 110_b_ will be provided for each bulk product type sold by the retailer.

The bulk product hopper 110_a_, 110_b_ comprises a dispensing spout 114_a_, 114_b_ and an actuator (not shown) such as a handle, button or the like. In use, a customer actuates the actuator, for example by pulling down a handle, which causes the dispensing spout 114_a_, 114_b_ of the hopper to open and dispense the product contained in the hopper 110_a_, 110_b_. The customer can select when to stop dispensing the product, for example by releasing the actuator, which causes the dispensing spout 114_a_, 114_b_ to close and the flow of product to stop.

Once a customer has completed dispensing a product from the hopper 110_a_, 110_b_, they bring a container containing the dispensed product to a weighing apparatus 130 to be weighed. The weighing apparatus 130 comprises a scale (not shown) and a user interface including a display 132. The customer can select the product type through the user interface and weigh the dispensed product on the scale. The weighing apparatus 130 further may comprise a printer for printing a label indicating the type of product, weight and price for scanning at a point of sale.

To improve the customer experience at the bulk product dispensing system 1000, it can be desirable for the weighing apparatus to be able to predict which product will be weighed next by a customer. In this way, the weighing apparatus 130 can pre-emptively display the predicted product on the display 132 for selection by the customer. This may be particularly advantageous in a large retail environment having a large number of products and thus a large number of hoppers 110*a*, 110*b* in the bulk product dispensing system 120, which requires the customer to search through a large number of product types at the weighing apparatus 130. To achieve this, the bulk product dispensing system 1000 is configured to detect each time a dispensing event occurs at each hopper 110*a*, 110*b*, and communicate this information to the weighing apparatus 130.

In order to facilitate the detection of dispensing events, the bulk product dispensing system 1000 comprises an apparatus 112*a*, 112*b* associated with each bulk product hopper 110*a*, 110*b*. Each apparatus 112*a*, 112*b* comprises a sensor arrangement for detecting a flow of product from the spout 114*a*, 114*b* of the respective hopper 110*a*, 110*b*. A control system 120 of the bulk product dispensing system 1000 is configured to receive sensor data from each sensor arrangement and determine when a dispensing event occurs for each hopper 110*a*, 110*b*. The control system 120 is then configured to communicate an indication of each dispensing event to the weighing apparatus 130.

Figure 2:
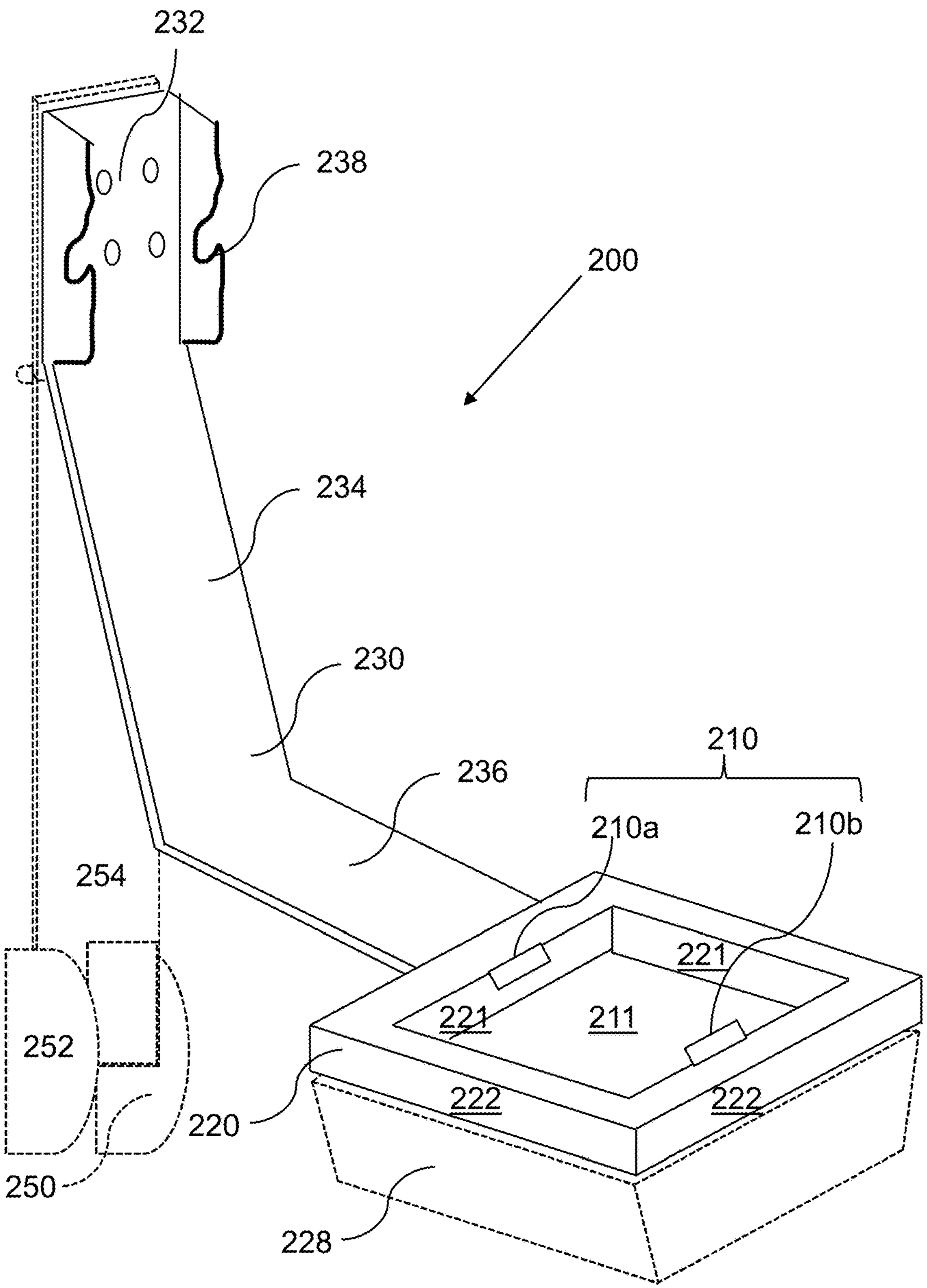
FIG. 2 is an illustration of an apparatus according to an embodiment.

With reference to FIG. 2, there is shown an apparatus 200 according to one embodiment for detecting a dispensing event in a bulk product dispensing system such as the system 1000. The apparatus 200 may correspond to the apparatus 112*a*, 112*b*.

The apparatus 200 comprises a sensor arrangement 210 for detecting a flow of product through a detection zone 211, in particular, the flow of product from the spout 114*a*, 114*b* of a hopper 110*a*, 110*b*. The detection zone 211 corresponds to an area through which the product will pass when the hopper 110*a*, 110*b* is dispensing, for example an area immediately below the spout 114*a*, 114*b* or within a predetermined distance from the spout along a dispensing path, e.g. 1 cm or 2 cm below the spout 114*a*, 114*b*. The sensor arrangement 210 comprises a transmitter module 210*a* configured to generate a transmission beam and a receiver module 210*b* configured to detect the transmission beam generated by the transmitter module 210*a*.

The transmitter module 210*a* and receiver module 210*b* are distributed about the detection zone 211 so that in use, flow of product through the detection zone 211 causes the transmission beam generated by the transmitter module 210*a* to be altered. Flow of product through the detection zone 211 may cause the transmission beam to be broken, or otherwise altered beyond a predefined threshold. For example, the predefined threshold may be a change in intensity, amplitude or frequency of the transmission beam. Thus, presence of the flow of product within the detection area 211 causes an alteration or a break in the beam detected the receiver module 210*b*.

The transmitter module 210*a* and receiver module 210*b* can be configured to utilise any type of waveform, such as an EM wave, ultrasonic wave or the like. In one embodiment, the sensor arrangement 210 is an infra-red, IR, sensor arrangement 210. Thus, the transmitter module 210*a* comprises an infra-red, IR, transmitter module 210*a* (e.g. an LED) configured to generate a transmission beam of IR pulses and the receiver module 210*b* comprises an infra-red, IR, receiver module 210*b* (e.g. an IR receiver, a photodiode) configured to detect the transmission beam of IR pulses generated by the corresponding IR transmitter module 210*a*. The frequency of the transmission beam can be adjusted depending on the type of product to be sensed, however a transmission beam of IR pulses in the range of 300-400 Hz, e.g. 333 Hz, has been found to provide a suitable detection accuracy.

The apparatus 200 comprises at least one retainer 220 in the form of a detector frame 220 for retaining the sensor arrangement 210 about the detection zone 211. The detector frame 220 is formed from a rigid material such as plastic, metal or the like, and acts to support the sensor arrangement 210 so that the transmitter module 210*a* and receiver module 210*b* are disposed at predetermined positions with respect to the detection zone 211. In the illustrated embodiment the detector frame 220 locates the transmitter module 210*a* on a first side of the detection zone and the receiver module 210*b* on a second side of the detection zone 211 opposing the first side.

Thus, the detector frame 220 extends at least along the first side and second side of the detection zone 211, such that the transmitter module 210*a* and receiver module 210*b* are supported in an opposing configuration where the transmission beam traverses the detection zone 211. In the illustrated embodiment, this is achieved by the detector frame 220 surrounding the detection zone 211 on all sides, which beneficially provides structural rigidity and prevents tampering. However, in other embodiments it can be envisaged that the detector frame 220 extends only partially around the detection zone 211. In the illustrated embodiment the detector frame 220 is square, however in other embodiments the detector frame 220 may be differently shaped, for example a non-square polygon, circle or the like. The detector frame 220 may itself define the boundary of the detection zone 211, or may define a perimeter larger than the detection zone 211.

The detector frame 220 comprises at least one inner surface portion 221 facing inwardly towards the detection zone 211 and at least one outer surface portion 222 facing outwardly away from the detection zone 211. In the illustrated embodiment the inner surface portion 221 and outer surface portion 222 are different faces of the frame, however it can be envisaged that in another embodiment the frame 220 may comprise one or more curved faces which extend around the frame and include both an inner portion 221 and outer portion 222.

The transmitter module 210*a* and receiver module 210*b* are each disposed on an inner surface portion 221 of the detector frame 220 such that the transmitter module 210*a* and receiver module 210*b* face the detection zone 211. In the illustrated embodiment, the transmitter module 210*a* is disposed on a first inner surface portion of the detector frame and the receiver module 210*b* is disposed on a second inner surface portion of the detector frame opposing the first inner surface portion.

Although not shown, the outer surface portion 222 of the detector frame 220 can be used to mount other features of the dispensing system 1000. For example, the apparatus 200 may comprise an electronic shelf label, ESL, mounted on the outer surface portion 222 of the detector frame. This provides a location for mounting an ESL for the product separately from the hopper. Furthermore, the ESL can be connected for power supply and data connections in a wired configuration via the apparatus 200. Additionally, the apparatus 200 may be connectable to a directing apparatus 228 for directing a product to flow into a receptacle (not shown).

The directing apparatus 228 may be a funnel which is mounted on, or otherwise connected to, the detector frame 220 and positioned below the sensor arrangement 210. The directing apparatus 228 may be removably attached to the detector frame 220 or may be integrated with the detector frame 220. The directing apparatus 228 may be shaped to direct the product to flow into the receptacle (not shown). The directing apparatus 228 may have a larger opening on a first side, which is mounted uppermost parallel to the detection zone 211 of the detector frame 220 and may narrow towards a smaller opening on a second side which is mounted to be a lowermost side parallel to the detection zone 211 of the detector frame. The directing apparatus 228 may have a square, round, conical, frustoconical, or otherwise tapered shape. The directing apparatus 228 may be shaped to hold or mount a receptacle (not shown) for product to flow into the receptacle.

In the illustrated embodiment the apparatus 200 comprises a fixture 230 extending from the detector frame 220. In one embodiment the fixture 230 comprises an arm or other support structure which is configured to be mounted to a surface, such as a wall, within the retail environment. In another embodiment, the arm or other support structure is configured to be to mounted to a moveable mechanism 250, such as a cantilever, that is mounted to a surface such as a wall. For example, the moveable mechanism 250 may be configured to allow the fixture 230 to be moved relative to the surface, about a pivot point. The configuration of the moveable mechanism 250 may allow the fixture 230 to be moved forward (away) from the surface. Additionally, the configuration of the moveable mechanism 250 may allow the fixture 230 to be moved lower from a first (upper) position to a secondary (lower) position that is offset from the surface by a distance in the horizontal axis i.e. forward of the surface. The apparatus 200 can therefore be kept at the first height during normal operation and moved to the second height for easier access and for removing or replacing the hopper 110*a*, 110*b* for cleaning. In this way, the apparatus 200 can be separately mounted to the hopper 110*a*, 110*b*. The apparatus 200 can therefore remain mounted even when the hopper 110*a*, 110*b* is removed or replaced for cleaning. Furthermore, the apparatus 200 can be used with multiple types of hopper 110*a*, 110*b* and can incorporate hard wiring for supplying power and data connections to the sensor arrangement 210. In other embodiments however, the apparatus may be mounted directly on the hopper 110*a*, 110*b* and so may not comprise a fixture 230.

In the illustrated embodiment the fixture 230 comprises a mounting mechanism 232 for mounting the apparatus 200 to a surface, such as a wall or other structure in the retail environment, or a moveable mechanism 250. The mounting mechanism 232 may comprise for example a bracket or other structure which can be readily affixed to a surface or a moveable mechanism using fixing means such as screws, bolts or the like. The moveable mechanism 250 may comprise an additional mounting mechanism 252, which may function in a similar manner to the mounting mechanism 232, for mounting the apparatus 200 to a surface and comprises a pivot point. Furthermore, the moveable mechanism 250 may comprise a lowering arm 254. The moveable arm 254 may be able to be lowered about the pivot point of the additional mounting mechanism 252. The moveable arm 254 may generally maintain the original or "upright" orientation of the fixture 230, and apparatus 200, as it lowered from an upper position to a lower position.

The fixture 230 comprises an arm extending from the mounting mechanism 232 to the detector frame 220. In the illustrated embodiment, the arm comprises a first arm portion 236 attached to the detector frame 220 and a second arm portion 234 connecting the first arm portion 236 to the mounting mechanism 232. The first arm portion 236 and second arm portion 234 are formed from different materials having different elasticities. In particular, the first arm portion 236 is formed from a deformable or flexible material such as a plastic moulding. In this way, the first arm portion can be at least partially bent or deformed under the influence of force to allow the detector frame 220 to move with respect to the mounting mechanism 232, and return to its original position when the force is removed. This elasticity or flexibility may further be provided by shaping the first arm portion 236, by providing zig-zags or a concertinaed surface to facilitate the bending of the first arm portion 236. Allowing some elasticity in the arm by providing the first arm portion 236 advantageously helps to prevent damage to the detector frame 220 and sensor arrangement 210, for example when the hopper is being installed or removed close to the apparatus 200, or during any accidental or deliberate abuse by customers. The second arm portion 234 is formed from a rigid material having a low elasticity, such as a metallic material. In this way, the second arm portion 234 provides structural support and shape for the apparatus 200.

The fixture 230 can in some embodiments comprise an attachment mechanism 238 for releasably attaching a bulk product hopper, such as hopper 110*a* or 110*b*, to the apparatus 200. The attachment mechanism 238 comprises grooves or recesses into which a protrusion of the hopper 110*a*, 110*b* can slot to secure the hopper 110*a*, 110*b* in a fixed spatial relationship to the apparatus 200. The fixed spatial relationship is such that when the bulk product hopper is attached to the releasable attachment mechanism 238, a dispensing path from a spout 114*a*, 114*b* of the bulk product hopper intersects the detection zone 211 of the sensor arrangement 210. However, in alternative embodiments the attachment mechanism 238 may be omitted, and the hopper 110*a*, 110*b* can be mounted separately to the apparatus 200.

Figure 3A:
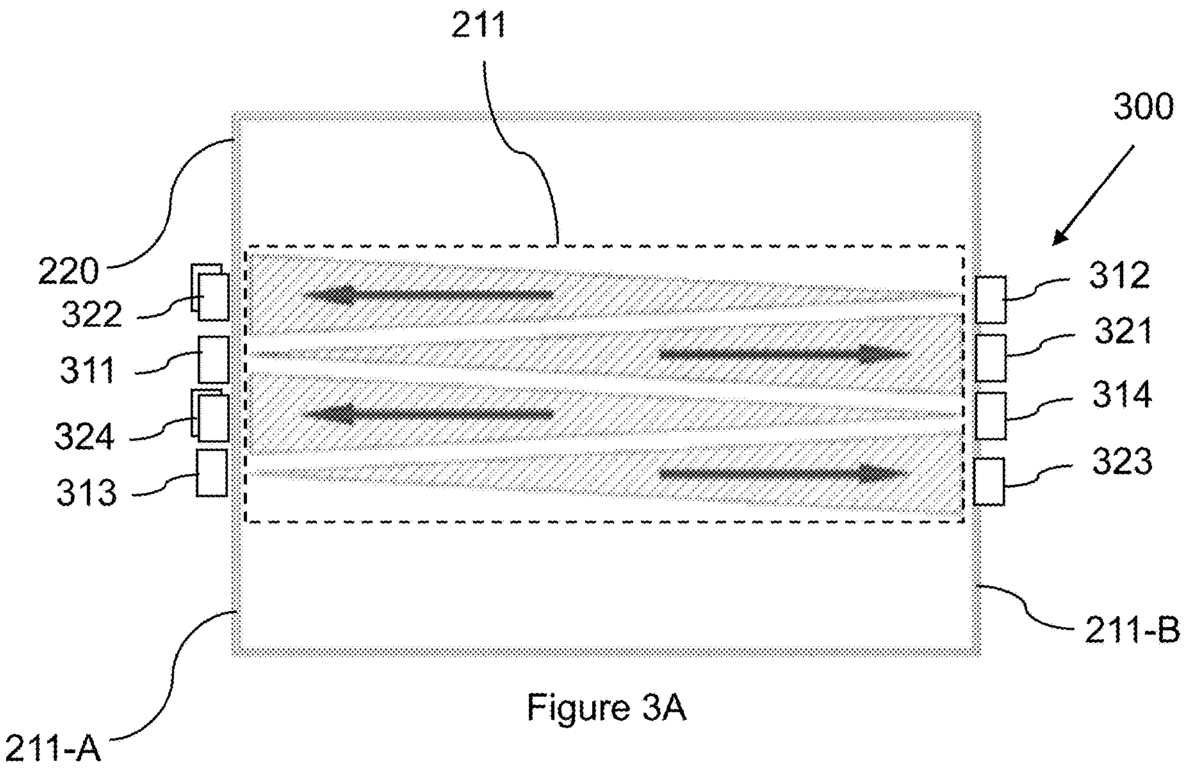
FIG. 3A shows a sensor arrangement according to an embodiment.

With reference to FIG. 3A, there is shown an example sensor arrangement 300 according to one embodiment of the invention. The sensor arrangement 300 may be implemented as the sensor arrangement 210 of the apparatus 200.

The sensor arrangement 300 comprises a plurality of transmitter modules 311, 312, 313, 314 and a plurality of corresponding receiver modules 321, 322, 323, 324 arranged to detect transmission beams emitted by the transmitter modules 311, 312, 313, 314. Each transmitter module may be analogous to the transmitter module 210*a* described with reference to FIG. 2, and likewise each of the receiver modules may be analogous to the previously described receiver module 210*b*. In the illustrated embodiment there is a one to one relationship between the transmitter and receiver modules, thus each transmitter module is paired with a corresponding receiver module according to the following relationship:

| Pair | Transmitter module | Receiver module |
|---|---|---|
| P1 | 311 | 321 |
| P2 | 312 | 322 |
| P3 | 313 | 323 |
| P4 | 314 | 324 |

Although the sensor arrangement 300 comprises four pairs of transmitter and receiver modules, in other embodiments the sensor arrangement 300 may comprise more or fewer pairs, depending on the area of the desired detection zone 211. The transmitter modules and receiver modules are disposed on two opposing sides of the detection zone. For each transmitter module 311, 313 disposed along a first side 211-A of the detection zone, the corresponding receiver module 321, 323 is disposed along a second side 211-B of the detection zone opposing the respective transmitter module 311, 313. Likewise, for each transmitter module 312, 314 disposed along the second side 211-B of the detection zone, the corresponding receiver module 322. 324 is disposed along the first side 211-A of the detection zone opposing the respective transmitted module.

Along each side 211-A, 211-B of the detection zone, the transmitter modules and receiver modules are alternately spaced. This beneficially provides even coverage of the detection zone. As illustrated, the area through which flow of product is detectable for each pair of modules is triangular in shape, widening from the transmitter module to the receiver module. Thus, the alternating arrangement enables these areas to tessellate without leaving triangular gaps through which the flow of product may not be detected.

In some embodiments, the pairs P1-P4 as identified in the above table may be grouped into base/slave pairs. That is, the first pair P1 may act as a base pair, and the second pair P2 may act as a slave pair. Correspondingly, the pairs P3 and P4 may be grouped with P3 acting as a base pair, and P4 acting as a slave pair. The transmitter modules 311, 313 of each base pair are disposed along the first side 211-A, and the transmitter modules 312, 314 of each slave pair are disposed along the second side 211-B.

Figure 3B:
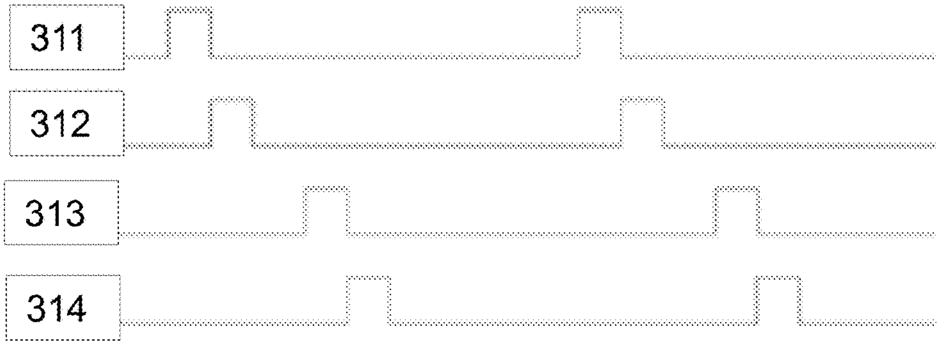
FIG. 3B shows a timing diagram representing pulses transmitted by the sensor arrangement.

With reference to FIG. 3B, there is shown an example timing diagram for pulses transmitted by the transmitter modules 311, 312, 313, 314 of the sensor arrangement 300. The base transmitter modules 311, 313 are each controlled directly to transmit a pulse. When the pulse is detected by the base receiver modules 321, 323, the base receiver modules 321, 323 then act to trigger the slave transmitter modules 312, 314 to return a pulse to the slave receiver modules 322, 324. The two base/slave pairs can be controlled independently, however in the illustrated timing diagram the second base/slave pair is controlled to pulse subsequently to the first base/slave pair. Overall, this arrangement can advantageously reduce the complexity of control electronics for the sensor arrangement 310 as no wired interconnection between the two sides 211-A, 211-B is required. Removing such an interconnection can improve the stability of the sensor arrangement 300.

Figure 4:
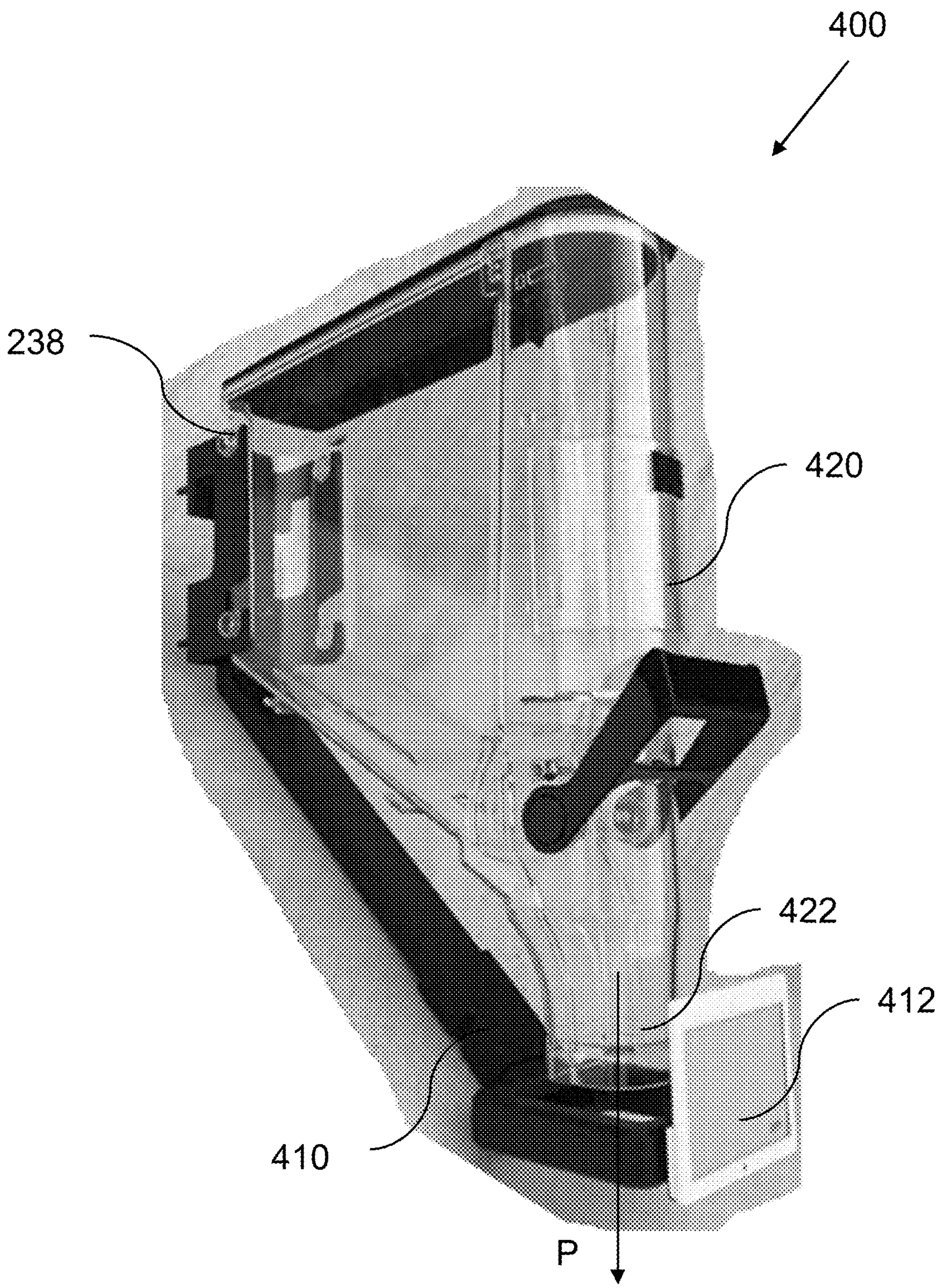
FIG. 4 shows a dispensing system according to an embodiment.

With reference to FIG. 4, there is shown an example bulk product dispensing system 400 according to an embodiment. The bulk product dispensing system 400 comprises an apparatus 410 analogous to the apparatus 200 shown in FIG. 2, and a bulk product hopper 420 releasably attached to the apparatus 410 via the attachment mechanism 238. In the illustrated embodiment the apparatus 410 further comprises an electronic shelf label, ESL 412, mounted to the detector frame. As can be seen, when the bulk product hopper 420 is attached to the apparatus 410, a dispensing path P from a spout 422 of the bulk product hopper intersects the detection zone of the apparatus 410. Thus, the apparatus 410 is shaped to correspond to the bulk product hopper 420 and locate the hopper 420 appropriately. However, in other embodiments, the hopper may be mounted separately, which allows the apparatus 410 to be utilized with a range of different hopper types.

Figure 5:
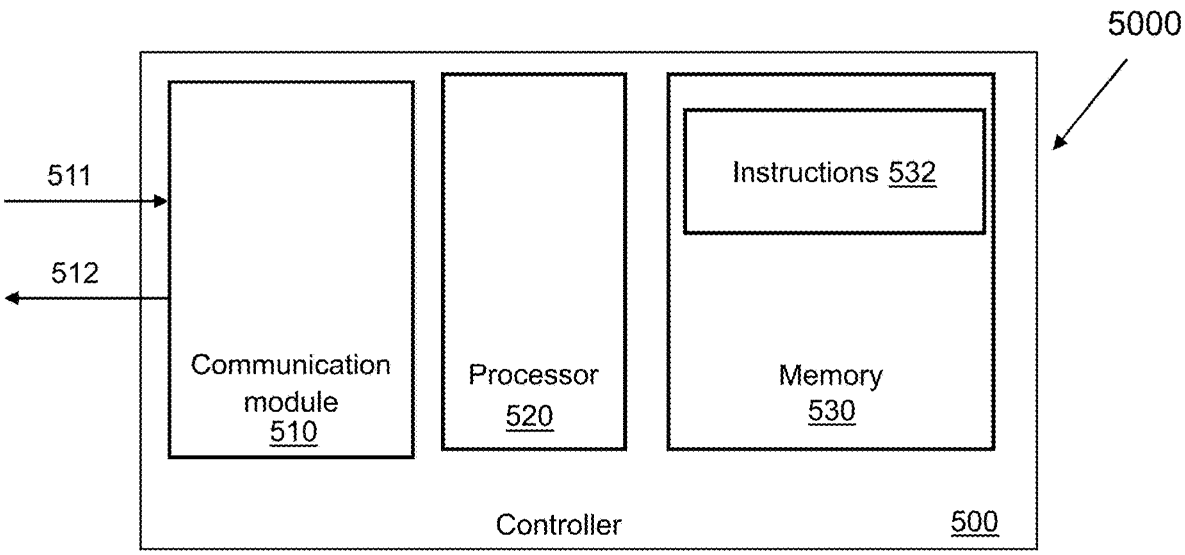
FIG. 5 is a schematic illustration of a control system according to an embodiment.

Turning to FIG. 5, there is shown a schematic illustration of a control system 5000 according to an embodiment. The control system 5000 may correspond to the control system 120 shown in FIG. 1, and thus may form part of the bulk dispensing system 1000.

The control system 5000 comprises at least one control module, or controller 500. In the illustrated embodiment the control system comprises a single controller 500, however in other embodiments the control system may comprise a plurality of controllers 500 which may be distributed about the bulk dispensing system 1000. Each controller 500 of the control system may be communicatively coupled. The connection may be via a wired connection or wirelessly via one or more networks 110, such as a local area network (LAN) in-store or the Internet. Thus, whilst the function of the control system will be described with reference to a single controller 500, this functionality may be distributed amongst a plurality of coupled controllers 500 in any suitable fashion.

The controller 500 comprises at least one processor 520, communication module 510 and memory 530. The processor 520 is arranged to perform a method according to instructions 532 stored in the memory 530. The memory 530 may comprise one or more memory devices, which may be disposed locally to the controller 500, remotely to the controller 500, or a combination. In the case of a remotely located memory device, the memory device may be wirelessly communicable with the processor 520 of the controller 510. The communication module 510 is configured to communicate with the sensor arrangement 210, 300 of each apparatus 112*a*, 112*b*, and with the weighing apparatus 130. The communication module 510 may comprise electrical connections for connecting to the sensor arrangement(s) and weighing apparatus via a wired connection, and/or may comprise hardware for performing wireless communication such as Wi-Fi, Bluetooth or the like.

The communication module 510 is arranged to receive a detection signal 511 from the or each sensor arrangement 210, 300. The detection signal 511 is indicative of the transmission beam detected or received at each receiver module 210*b*. The controller 500 is then configured to determine whether a dispensing event has occurred for the bulk product hopper 110*a*, 110*b* in dependence on the detection signal 511 received from the sensor arrangement at the corresponding apparatus 112*a*, 112*b*. The controller 500 is configured to determine whether a dispensing event has occurred in dependence on there being a break in the transmission beam detected at the receiver module 210*b*. In some embodiments, the controller 500 is configured to determine whether a predetermined time period has elapsed between the detected break at the receiver module 210*b* and any preceding break detected. If less than the predetermined time period has elapsed, the controller 500 may determine that the break detected corresponds to an existing dispensing event, and not a new dispensing event. The predetermined time period may be between 1 to 5 seconds, such as 3 seconds.

If the controller 500 determines that a new dispensing event has occurred for a bulk product hopper 110*a*, 110*b*, the communication module 510 is arranged to transmit a control signal 512 to the weighing apparatus 130 to indicate that the new dispensing event has occurred. For example, the control signal 512 may be output to a control module of the weighing apparatus 130.

The control module of the weighing apparatus 130 is then configured to identify a product associated with the bulk product hopper, and display an indication of the dispensing event for the product on the display device 132. In this way, when a customer approaches the weighing apparatus 130 after dispensing a product at the hopper 110*a*, the display 132 can pre-emptively display the relevant product for selection by the customer.

Figure 6:
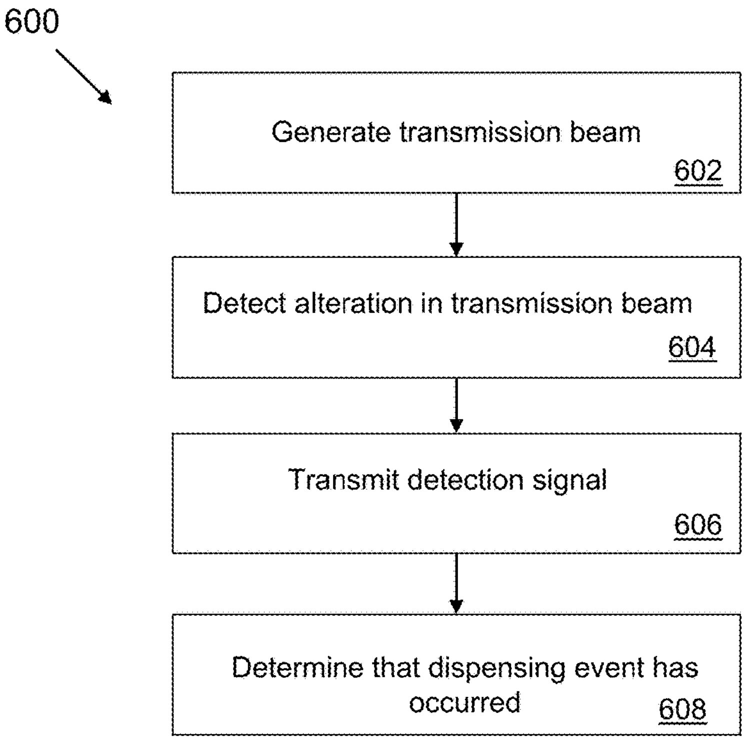
FIG. 6 is a flow chart of a method according to an embodiment.

With reference to FIG. 6, there is shown a flow chart of a method 600 according to an embodiment. The method 600 may be performed by the system 1000.

The method comprises a block 602 of generating, at the transmitter module 210*a* of the apparatus 112*a*, a transmission beam. In block 604, the receiver module 210*b* of the apparatus 112*a* detects an alteration, such as a break, in the transmission beam. In block 606, the receiver module 210*b* communicates a detection signal 511 indicative of the break in the transmission beam to the controller 500. In block 608, the controller determines that a dispensing event has occurred in dependence on the received detection signal 511.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An apparatus for detecting a dispensing event in a bulk product dispensing system, the apparatus comprising:

a sensor arrangement for detecting flow of product through a detection zone, the sensor arrangement comprising a transmitter module and a receiver module, wherein, in use, the flow of product through the detection zone causes a transmission beam between the transmitter module and receiver module to be altered; and at least one retainer for retaining the sensor arrangement about the detection zone;

wherein the transmitter module is disposed on a first side of the detection zone and the receiver module is disposed on a second side of the detection zone opposing the transmitter module;

wherein the at least one retainer comprises a detector frame surrounding the detection zone and wherein:

the transmitter module is disposed on a first inner surface of the detector frame facing the detection zone, and the receiver module is disposed on a second inner surface of the detector frame opposing the first inner surface and facing the detection zone.

2. The apparatus of claim 1, comprising an attachment mechanism for releasably attaching a bulk product hopper to the apparatus, such that when the bulk product hopper is attached to the apparatus, a dispensing path from a spout of the bulk product hopper intersects the detection zone of the sensor arrangement.

3. A bulk product dispensing system comprising:

the apparatus of claim 2, wherein the attachment mechanism includes at least one groove or recess; and a bulk product hopper releasably attached to the apparatus, such that a dispensing path from a spout of the bulk product hopper intersects the detection zone of the sensor arrangement, wherein the bulk product hopper includes a protrusion seated within the at least one groove or recess to secure the bulk product hopper.

4. The bulk product dispensing system of claim 3, further comprising a control module communicatively coupled to the sensor arrangement, wherein the control module is arranged to:

receive a detection signal from the sensor arrangement indicative that the transmission beam between the transmitter module and the receiver module has been altered; and determine that a dispensing event has occurred for the bulk product hopper in dependence on receiving the detection signal.

5. The bulk product dispensing system of claim 4, further comprising a weighing apparatus, wherein the control module is configured to transmit a control signal to a weighing apparatus in dependence on the determination that a dispensing event has occurred for the bulk product hopper, and wherein the weighing apparatus is configured to display an indication of the dispensing event for the bulk product hopper on a display device of the weighing apparatus.

6. The bulk product dispensing system of claim 4, comprising a further apparatus for detecting a dispensing event in a bulk product dispensing system and a further bulk product hopper releasably attached to the further apparatus, wherein the control module is communicatively coupled to the sensor arrangement of each of the apparatus and the further apparatus.

7. A method for detecting a dispense event using the bulk product dispensing system of claim 3, comprising:

generating, at the transmitter module, the transmission beam;

detecting, at the receiver module, an alteration in the transmission beam;

in dependence on the detection of the alteration in the transmission beam, transmitting a detection signal to the control module; and determining that a dispensing event has occurred for the bulk product hopper in dependence on receiving the detection signal.

8. The apparatus of claim 1, further comprising an electronic shelf label, ESL, mounted on an outer surface of the at least one retainer.

9. The apparatus of claim 1, further comprising a fixture extending from the at least one retainer, the fixture being configured to mount the apparatus to a surface.

10. The apparatus of claim 9, wherein the fixture comprises a mounting mechanism for mounting the apparatus to a surface, a first flexible arm portion attached to the at least one retainer and a second rigid arm portion connecting the first flexible arm portion to the mounting mechanism.

11. The apparatus of claim 10, wherein the first flexible arm portion is formed from plastic moulding and the second rigid arm portion is metallic.

12. The apparatus of claim 1, wherein the sensor arrangement comprises a plurality of transmitter modules and a plurality of corresponding receiver modules.

13. The apparatus of claim 12, wherein the sensor arrangement comprises:

a plurality of alternately spaced transmitter and receiver modules along a first side of the detection zone; and a corresponding plurality of alternately spaced transmitter and receiver modules along a second side of the detection zone, such that each transmitter module opposes a receiver module and vice versa;

wherein, in use, the flow of product through the detection zone causes a transmission beam between at least one of the transmitter modules and its opposing receiver module to be altered.

14. The apparatus of claim 1, wherein the or each transmitter module comprises an infra-red, IR, transmitter module configured to generate an IR pulse and the or each receiver module comprises an infra-red, IR, receiver module configured to detect the IR pulse generated by the corresponding IR transmitter module.

15. The apparatus of claim 14 wherein each transmitter module is arranged to generate a transmission beam of IR pulses at 300-400 Hz.

16. The apparatus of claim 1, wherein an arm structure includes a first end connected to and supporting the detector frame, and second end disposed outward and upward relative to the detector frame, the second end connected with a bracket for attaching the apparatus to a surface.

17. The apparatus of claim 1, wherein the dispensing path is open to the first inner surface and the second inner surface.

18. An apparatus for detecting a dispensing event in a bulk product dispensing system, the apparatus comprising:

a sensor arrangement for detecting flow of product through a detection zone, the sensor arrangement comprising a transmitter module and a receiver module, wherein, in use, the flow of product through the detection zone causes a transmission beam between the transmitter module and receiver module to be altered; and at least one retainer for retaining the sensor arrangement about the detection zone;

a fixture extending from the at least one retainer, wherein the fixture comprises a mounting mechanism for mounting the apparatus to a surface, a first flexible arm portion attached to the at least one retainer and a second rigid arm portion connecting the first flexible arm portion to the mounting mechanism;

wherein the first flexible arm portion comprises an concertinaed surface.

* * * * *